United States Patent
Wojtasinski et al.

[11] 3,820,095
[45] June 25, 1974

[54] ELECTRIC FIELD MEASURING AND DISPLAY SYSTEM

[75] Inventors: Ronald J. Wojtasinski, Cocoa Beach; Donald D. Lovall, Rockledge, both of Fla.

[73] Assignee: The United States of America as represented by the Administrator of the National Aeronautics and Space Administration, Washington, D.C.

[22] Filed: Sept. 13, 1972

[21] Appl. No.: 288,847

[52] U.S. Cl............ 340/200, 73/170 R, 340/182, 340/151, 324/72
[51] Int. Cl............................................. G08c 19/10
[58] Field of Search ......... 340/200, 182, 184, 151; 73/170; 324/32, 72

[56] References Cited
UNITED STATES PATENTS

| | | |
|---|---|---|
| 2,820,947 | 1/1958 | Gunn .................................. 324/32 |
| 2,993,165 | 7/1961 | Jauch .................................. 324/32 |
| 3,253,260 | 5/1966 | Hawley .............................. 340/182 |
| 3,344,344 | 9/1967 | Wales, Jr. ........................... 324/72 |

Primary Examiner—Thomas B. Habecker
Attorney, Agent, or Firm—James O. Harrell; John R. Manning

[57] ABSTRACT

An apparatus for monitoring the electric fields of cloud formations within a particular area which utilizes capacitor plates that are alternately shielded from the clouds for generating an alternating signal corresponding to the intensity of the electric field of the clouds. A synchronizing signal is produced for controlling sampling of the alternating signal. Such samplings are fed through a filter and converted by an analogue to digital converter into digital form and subsequently fed to a transmitter for transmission to the control station for recording.

4 Claims, 1 Drawing Figure

PATENTED JUN 25 1974　　　　　　　　　3,820,095
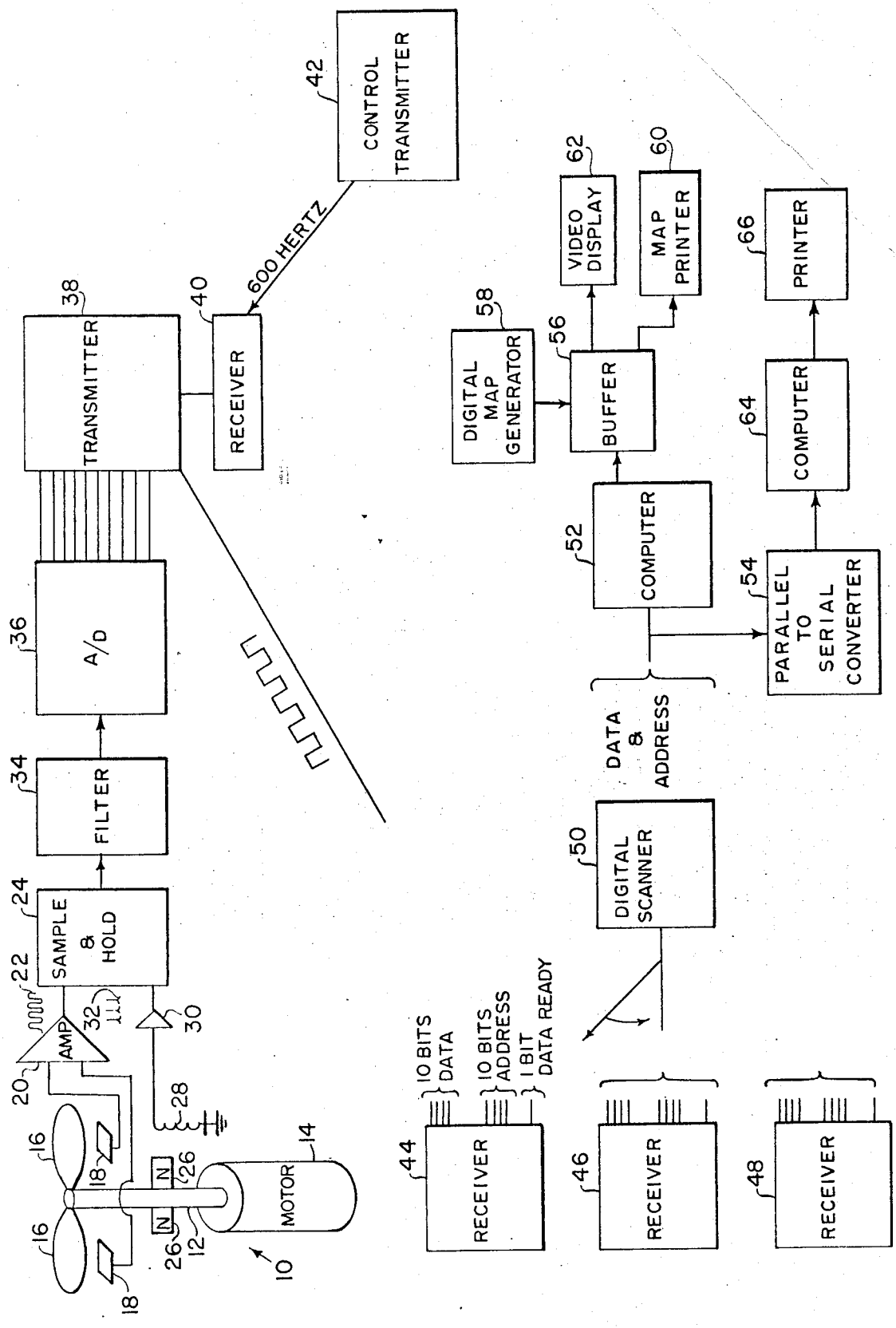

ELECTRIC FIELD MEASURING AND DISPLAY SYSTEM

This invention described herein was made by employees of the United States Government, and may be manufactured and used by or for the Government for Governmental purposes without the payment of any royalties thereon or therefor.

This invention relates to an apparatus for monitoring electric fields, and more particularly to an apparatus for plotting the electric fields possessed by cloud formations over a given area.

In recent years the space industry, in particular, has become extremely concerned with the hazards of electric fields generated by cloud formations in the area of missile launch sites. If the electric field intensity of a particular cloud formation is above a predetermined value, there is a possibility that a space vehicle being launched through the cloud may cause the cloud formation to discharge causing lightning to strike the space vehicle. This occured in the Apollo XII moon shot endangering the lives of the astronauts aboard the space vehicle, as well as jeopardizing the function of many of the sensitive instruments carried thereon. If the electric field of the cloud formations over a launch area is known, skilled technicians can anticipate to a certain degree the potential hazard of the cloud discharging. Therefore, by strategically locating a plurality of electric field measuring devices geographically throughout the area to be monitored it is possible to record and map the electric field of the cloud formations over the area for subsequent study.

In accordance with the present invention it has been found that such can be accomplished by providing an apparatus for monitoring the electrical fields of cloud formations over a predetermined area with the following basic components: (1) A plurality of sensing stations positioned at predetermined locations within the area being monitored, (2) each of the sensing stations including, at least a pair of capacitor plates located in the area facing the cloud formation, means coupling the capacitor plates to an amplifier, means alternately shielding the capacitor plates from the cloud formation for generating an alternating signal on the output of an amplifier corresponding to the intensity of the electric field of the cloud formations above the capacitor plates, means generating a synchronizing signal having a frequency corresponding to the rate that the capacitor plates are alternately shielded, means activated by the synchronizing signal for sampling the peaks of the alternating signal for generating a D.C. signal which varies according to the electric field sensed by the capacitor plates, means for converting the varying D.C. signal to a digital signal, and a transmitter for transmitting the digital signal responsive to receiving a command signal, a receiver located at the central command station, means for generating command signals for selectively activating the transmitters at the sensing stations for transmitting the digital signals to the receiver, and a computer provided for receiving the digital signals for feeding such to a map printer along with signals received from a digital map generator for superimposing the digital signals onto a simulated map of the area. Other recording devices such as video display equipment and printers which print data collected on the electric fields in engineering units are utilized.

Accordingly, it is an important object of the present invention to provide an apparatus for monitoring electric fields of cloud formations over a particular area.

Another important object of the present invention is to provide a system which monitors the electric fields of cloud formations and prints the data collected onto a simulated map of the area being monitored.

Still another important object of the present invention is to provide a system for monitoring the electric fields at various strategic locations within an area so as to create a printed record or chart simulating the overall electric field.

Other objects and advantages of this invention will become more apparent from a reading of the following detailed description and appended claims taken in conjunction with the accompanying drawing wherein:

The FIGURE illustrates in block form an apparatus for monitoring the electric field of cloud formations within a given area.

In order to record the electric field of cloud formations over a given area it is necessary to strategically locate electric field measuring devices throughout the area to be mapped and accumulating the readings from these electric field measuring devices and plotting such on a simulated map of the area being monitored. In one particular device constructed in accordance with the present invention, the field measuring devices generally designated by the reference character 10, includes a shaft 12 which is rotated by a motor 14 and has a pair of metallic leaf-like blades 16 carried on the top thereof. Positioned directly below the blades 16 are a pair of capacitor plates 18. When the shaft 12 is rotated the capacitor plates 18 alternate from a shielded to an unshielded condition. When the plates 18 are in the unshielded condition they sense the electric field of the clouds directly thereabove. The signals received by the capacitor plates 18 are, in turn, fed through an amplifier 20 which generates an alternating A.C. signal 22 on its output. This alternating A.C. signal 22 is, in turn, fed into a sample and hold circuit 24.

Also, carried on the rotating shaft 12 are magnets 26 which are provided for generating a synchronizing signal. There is one magnet 26 per blade for generating a pulse each time a blade 16 passes over a capacitor plate 18. A magnetic pick-up 28 is provided closely adjacent the magnets 26 for producing a pulse each time the magnet is rotated thereby. These pulses are fed through amplifier 30 for amplification to generate the synchronizing pulses 32 which are fed to the sample and hold circuit 24. Such causes the sample and hold circuit to sample the peaks of each of the half-cycles of the alternating A.C. signal 22. The sample and hold circuit 24, in turn, produces an output signal which takes the form of a varying D.C. signal. This varying D.C. signal is fed through filter circuit 34 which smoothes out the signal.

The output of the filter circuit 34 is, in turn, coupled to an analogue to digital converter 36 which converts the analogue signals into a ten bit parallel signal. The analog to digital converter may be any suitable conventional analog to digital converter. One such converter is manufactured by Burr-Brown Research Corporation of Tucson, Arizona, and has a Model No. ADC 20–10-N–BTC. The 10 bit parallel signal is fed in parallel form into any suitable conventional transmitter 38.

The transmitter has coupled thereto a control receiver 40 which generates a command signal for causing the transmitter 38 to transmit the digital signals provided therein. In order to activate the control receiver 40 a control transmitter 42, which may be located at the master control station, is provided for generating a 600 cycle per second coded signal which provides a signal for the control receiver 40 to produce a command signal. The command signal produced by the receiver 40 causes the transmitter 38 to transmit the 10 bits of information coming therein out in serial form. Such are at a carrier frequency of 1,600 hertz. For each sensing station 10 there is a transmitter 38 which transmits a signal representing the electric field directly above the sensing station and a code identifying the particular station from which the signal was generated. The signals being transmitted from the transmitter 38 is received by one of the receivers 44, 46, or 48. Each of the receivers, in one particular embodiment, is provided for receiving information from twenty different transmitters 38, therefore, when there are sixty sensing stations, there will be three receivers such as shown in the drawing.

The output of the receivers 44, 46, and 48 include 10 bits of parallel information representing the electric field sensed, ten bits of address information representing the particular sensing station and a data ready bit which is fed to a digital scanner 50 whenever there is information received at one of the receivers 44, 46 and 48.

The digital scanner, in turn, scans the information being supplied from the three receivers and feeds such information in parallel form into a computer 52 and a parallel to serial converter 54. Connected to the output the computer 52 is a buffer unit 56 which also has connected thereto a conventional digital map generator 58. The digital information from the computer 52 and the digital map generator 58 is fed through the buffer 56 to a map printing device 60 and a video display device 62. The map printing device prints a map of the particular area being sampled showing the electrical field values superimposed thereon. These electrical fields normally show up in the form of circular fields with the strongest point being in the center of the field. From analyzing these maps a skilled person can generally predict when a lightning storm is about to occur.

The parallel to serial converter 54 converts the digital information into serial form and feeds such to a second computer 64 which has a printer 66 coupled to its output for printing the information in engineering units.

While the particular circuit shown and described for sensing electric fields, it is to be understood that it could be used for monitoring many other functions, such as temperature, pressure, and air pollutants. Such may be accomplished by merely changing the type sensing units utilized.

While a preferred embodiment of the invention has been described using specific terms, such description is for illustrative purposes only, and it is to be understood that changes and variations may be made without departing from the spirit or scope of the following claims.

We claim:
1. An apparatus for monitoring the electric fields for cloud formations within a particular area comprising:

A. a pair of capacitor plates located in said area facing said cloud formation being monitored,
B. means for coupling said capacitor plates to an amplifier,
C. means for alternately shielding said capacitor plates from said cloud formations for generating an alternating signal on the output of said amplifier corresponding to the intensity of said electric field of said cloud formation above said capacitor plates,
D. means for generating a synchronizing signal having a frequency corresponding to the rate said capacitor plates are alternately shielded,
E. means activated by said synchronizing signal for sampling the peaks of said alternating signal for generating a D.C. signal which varies according to the electric field sensed by said capacitor plates, and
F. means for converting said varying D.C. signal to a digital signal representing the intensity of said electric field of said cloud formation.

2. The apparatus as set forth in claim 1 wherein said means for alternately shielding said capacitor plates includes:
A. a vertical shaft,
B. a pair of blades carried on said shaft extending outwardly beyond and above said capacitor plates, and
C. means for rotating said shaft so that said blades alternately shield said capacitor plates from said cloud formation.

3. The apparatus as set forth in claim 2, wherein said means for generating a synchronizing signal includes:
A. a magnet carried on said shaft in alignment with each of said blades, and
B. a magnetic pick-up means carried adjacent the path of said magnets on said rotating shaft for generating a signal each time one of said magnets passes thereby.

4. A system for charting the electric field for cloud formations within a given area comprising:
A. a plurality of sensing stations positioned at predetermined locations within said areas,
B. each of said sensing stations including,
1. a pair of capacitor plates located in said area facing skywards,
2. means coupling said capacitor plates to an amplifier,
3. means alternately shielding said capacitor plates from said cloud formations for generating an alternating signal on the output of said amplifier corresponding to the intensity of said electric field of said cloud formation above said capacitor plates,
4. means generating a synchronizing signal having a frequency corresponding to the rate said capacitor plates are alternately shielded,
5. means activated by said synchronizing signal for sampling the peaks of said alternating signal for generating a D.C. signal which varies according to the electric field sensed by said capacitor plates, and
6. means for converting said varying D.C. signal to a digital signal (and) representing the intensity of said electric field of said cloud formation.

* * * * *